(12) United States Patent
Martin et al.

(10) Patent No.: US 7,453,878 B1
(45) Date of Patent: Nov. 18, 2008

(54) SYSTEM AND METHOD FOR ORDERING OF DATA TRANSFERRED OVER MULTIPLE CHANNELS

(75) Inventors: Randal G. Martin, San Jose, CA (US); Steven C. Miller, Livermore, CA (US); Mark D. Stadler, Sunnyvale, CA (US); David A. Kruckemyer, Mountain View, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 734 days.

(21) Appl. No.: 09/910,587

(22) Filed: Jul. 20, 2001

Related U.S. Application Data

(60) Provisional application No. 60/219,915, filed on Jul. 21, 2000.

(51) Int. Cl.
 *H04L 12/56* (2006.01)
 *H04L 12/26* (2006.01)
 *H04J 3/16* (2006.01)
(52) U.S. Cl. .................. 370/394; 370/231; 370/437
(58) Field of Classification Search ................ 370/394, 370/230, 235, 229, 437, 465, 231, 236, 412
 See application file for complete search history.

(56) References Cited

U.S. PATENT DOCUMENTS

| 5,222,061 | A * | 6/1993 | Doshi et al. ................. 370/394 |
| 5,825,748 | A * | 10/1998 | Barkey et al. ............... 370/236 |
| 6,154,794 | A | 11/2000 | Abdalla et al. |
| 6,243,358 | B1 * | 6/2001 | Monin ......................... 370/229 |
| 6,246,684 | B1 * | 6/2001 | Chapman et al. ............ 370/394 |
| 6,594,701 | B1 * | 7/2003 | Forin .......................... 709/232 |
| 6,810,428 | B1 * | 10/2004 | Larsen et al. ............... 709/238 |
| 6,944,173 | B1 * | 9/2005 | Jones et al. ................. 370/413 |
| 2004/0049612 | A1 * | 3/2004 | Boyd et al. .................... 710/52 |

* cited by examiner

*Primary Examiner*—Aung S. Moe
*Assistant Examiner*—Feben M Haile
(74) *Attorney, Agent, or Firm*—Baker Botts L.L.P.

(57) ABSTRACT

A multiple channel data transfer system (10) includes a source (12) that generates data packets with sequence numbers for transfer over multiple request channels (14). Data packets are transferred over the multiple request channels (14) through a network (16) to a destination (18). The destination (18) re-orders the data packets received over the multiple request channels (14) into a proper sequence in response to the sequence numbers to facilitate data processing. The destination (18) provides appropriate reply packets to the source (12) over multiple response channels (20) to control the flow of data packets from the source (12).

14 Claims, 2 Drawing Sheets

SYSTEM AND METHOD FOR ORDERING OF DATA TRANSFERRED OVER MULTIPLE CHANNELS

RELATED APPLICATIONS

This application claims the benefit of U.S. Provisional Application Ser. No. 60/219,915 filed Jul. 21, 2000.

TECHNICAL FIELD OF THE INVENTION

The present invention relates in general to computer information processing and more particularly to a system and method for ordering data transferred over multiple channels.

BACKGROUND OF THE INVENTION

Conventional data transfer schemes may provide flow control for a single channel. However, these schemes do not address the issue of splitting a transfer over multiple physical or virtual channels. In environments where the ordering of the data is important, splitting the data transfer over multiple channels may cause the data to sent in an order different from originally desired. For example, graphics systems may require the processing of data in a certain order to effectively generate an image for display that reflects the intended scene to be viewed. The destination will not be able to effectively process the data since it is received in a different order than when it was generated. Therefore, it is desirable to have a capability to re-order the data at the destination despite the use of multiple channels for data transfer.

SUMMARY OF THE INVENTION

From the foregoing, it may be appreciated by those skilled in the art that a need has arisen for a technique that can re-order data at a destination after the data has been transferred over multiple channels while providing flow control for the data transfer. In accordance with the present invention, a system and method for ordering data transferred over multiple channels are provided that substantially eliminate or greatly reduce disadvantages and problems associated with conventional data transfer techniques.

According to an embodiment of the present invention, there is provided a method for ordering data transferred over multiple channels that includes generating a data packet in response to a flow control credit. A sequence number is generated and inserted into the data packet. One of a plurality of channels to transfer the data packet is selected and the data packet is transferred over the selected one of the plurality of channels The present invention provides various technical advantages over conventional data transfer techniques. For example, one technical advantage is to associate a sequence number to data packets so that they can be placed into the proper sequence at the destination. Another technical advantage is to place data packets received from a source in an appropriate sequence despite transferring the data packets over multiple channels. Yet another technical advantage is to integrate re-ordering of data packets with flow control of the data packet transfer. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
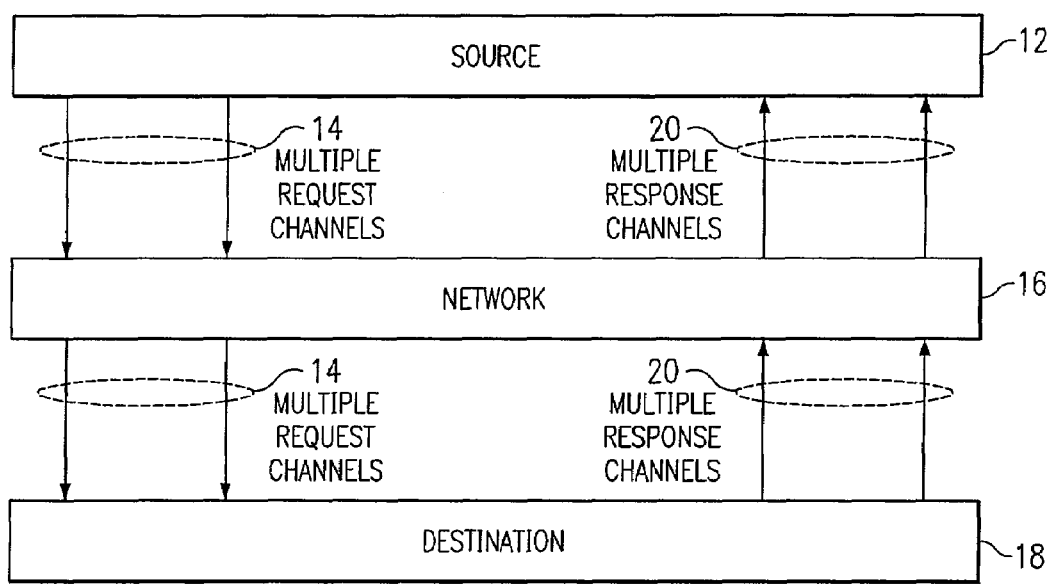
FIG. 1 illustrates a block diagram of a multiple channel data transfer system.

FIG. 1 is a block diagram of a multiple channel data transfer system 10. System 10 includes a source 12 that generates data packets for transfer over multiple request channels 14. Data packets are transferred over multiple request channels 14 through a network 16 to a destination 18. Destination 18 processes the data packets received over multiple request channels 14 and provides appropriate response packets to source 12 over multiple response channels 20 through network 16. In an exemplary scenario, system 10 may be a graphics system wherein source 12 is a node with one or more processors generating data packets and destination 18 is a graphics processor that generates images in response to the data packets. Multiple request channels 14 are needed as the amount of data generated by a processor of the node may exceed the bandwidth of a single channel. Network 16 may be any data transfer medium that may include one or more of a local area network, wide area network, Ethernet network, Internet, or any conventional network for transferring data.

Each data packet generated at source 12 may be placed onto any available one of the multiple request channels 14. For each data packet, source 12 determines an available channel according to capacity and flow control instructions. Examples of flow control implementations in single channel systems can be found in co-pending U.S. application Ser. No. 09/409,805 and U.S. Pat. No. 6,154,794, which are each hereby incorporated by reference herein. In a multi-channel implementation, a first packet may be sent on a first channel and a second packet may be sent on another channel. Because data packets may be sent on different channels, destination 18 may receive and buffer the second packet before the first packet even though the first packet was generated prior to generation of the second packet. Since the processing of data packets in the correct order is important, destination 18 needs to recognize that the first packet is to be processed before the second packet.

Figure 2:
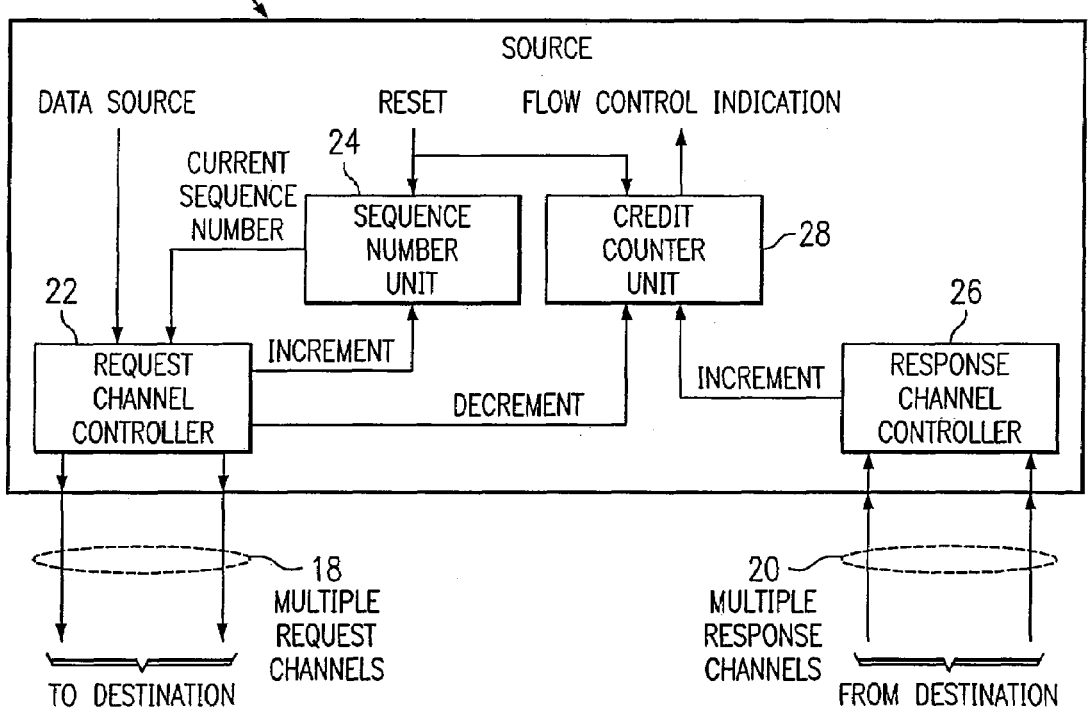
FIG. 2 illustrates a block diagram of a source for data packet generation in the multiple channel data transfer system.

FIG. 2 shows a block diagram for the generation of data packets at source 12. Source 12 includes a source request channel controller 22, a sequence number unit 24, a response channel controller 26, and a credit counter unit 28. Source request channel controller 22 generates data packets from data received from a data source, such as a processor, in source 12 and selects among multiple request channels for the transferring of the data packets. Alternatively, the data source may provide the data in packet form for transfer by source request channel controller 22.

Source request channel controller 22 inserts a sequence number as provided by sequence number unit 24 for each generated data packet. The sequence number is used by destination 18 in order to re-order the received data packets into the proper sequence. Upon inserting a sequence number into a data packet, source request channel controller 22 transfers the data packet onto a selected one of multiple request channels 14. Source request channel controller 22 issues an increment command to sequence number unit 24 so that the current sequence number provided by sequence number unit 24 to source request channel controller 22 is advanced to the next number in the sequence. The sequence number may be reset by the data source for each block of data to be transferred.

Source request channel controller 22 also issues a decrement command to credit counter unit 28 to indicate that a credit was used in transferring the data packet over the selected one of the multiple request channels 14. Credit counter unit 28 is initialized with a number of credits by a reset signal from the data source. The number of credits is decremented after transfer of each data packet from source request channel controller 22. Credit counter unit 28 provides a flow control indication to the data source to control the amount of data provided by the data source. As long as the number of credits is above a desired threshold value, the flow control indication informs the data source that it may continue to provide data. If the number of credits falls below the desired threshold value, the flow control indication informs the data source to cease providing data until the desired threshold value is again exceeded. The data source may force an interrupt to do a context switch in order that other tasks may be performed in the event that the flow control indication maintains the data cessation status for a certain period of time. The data source will then return to the transfer of data packets. The number of credits is incremented in response to response channel controller 26 receiving a reply from destination 18 over one of multiple response channels 20. The reply includes a credit indicating that destination 18 has processed a data packet and has capability to receive another data packet.

Figure 3:
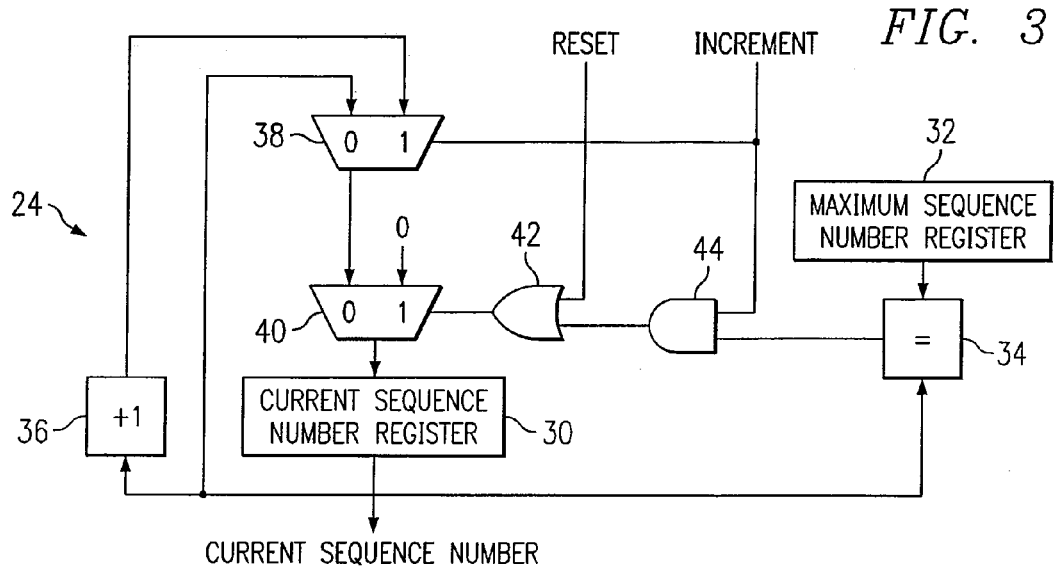
FIG. 3 illustrates a block diagram of a sequence number unit in the source.

FIG. 3 shows a block diagram of sequence number unit 24. Sequence number unit 24 includes a current sequence number register 30, a maximum sequence number register 32, comparator 34, increment unit 36, increment selectors 38 and 40, reset logic 42, and increment logic 44. Upon initialization, a reset signal from the data source causes a sequence number value of zero to be loaded into current sequence number register 30. Increment selector 38 receives the value in current sequence number register 30 and an incremented sequence number value from increment unit 36. Increment counter 38 provides the value from current sequence number register 30 to increment selector 40 unless an increment signal has been received from source request channel controller 22 indicating that a data packet with the value in current sequence number register 30 has been transferred. Increment selector 40 provides the value in current sequence number register 30 back thereto unless a reset signal is received from the data source or an increment signal is received from source request channel controller 22. The reset signal causes the zero value to be loaded into current sequence number register 30. The increment signal causes an incremented value to flow through increment selectors 38 and 40 for loading into current sequence number register 30.

Current sequence number register 30 may also be loaded with the zero value according to a maximum value in maximum sequence number register 32. The value in current sequence number register 30 is compared to the value in maximum sequence number register 32 at comparator 34. If these values are equal, comparator 34, through increment logic 44 and reset logic 42, causes the zero value at increment selector 40 to be loaded into current sequence number register 30. In this manner, a large data packet group may be accommodated without loss of packet ordering since sequence numbers will be freed up and available for re-use once a data packet has been processed. Current sequence number register 30 and maximum sequence number register 32 may be programmable to provide a range of sequence numbers to simplify buffering at destination 18. Also, the programmable nature of these registers allows for varying the size of buffers receiving data packets at destination 18.

Figure 4:
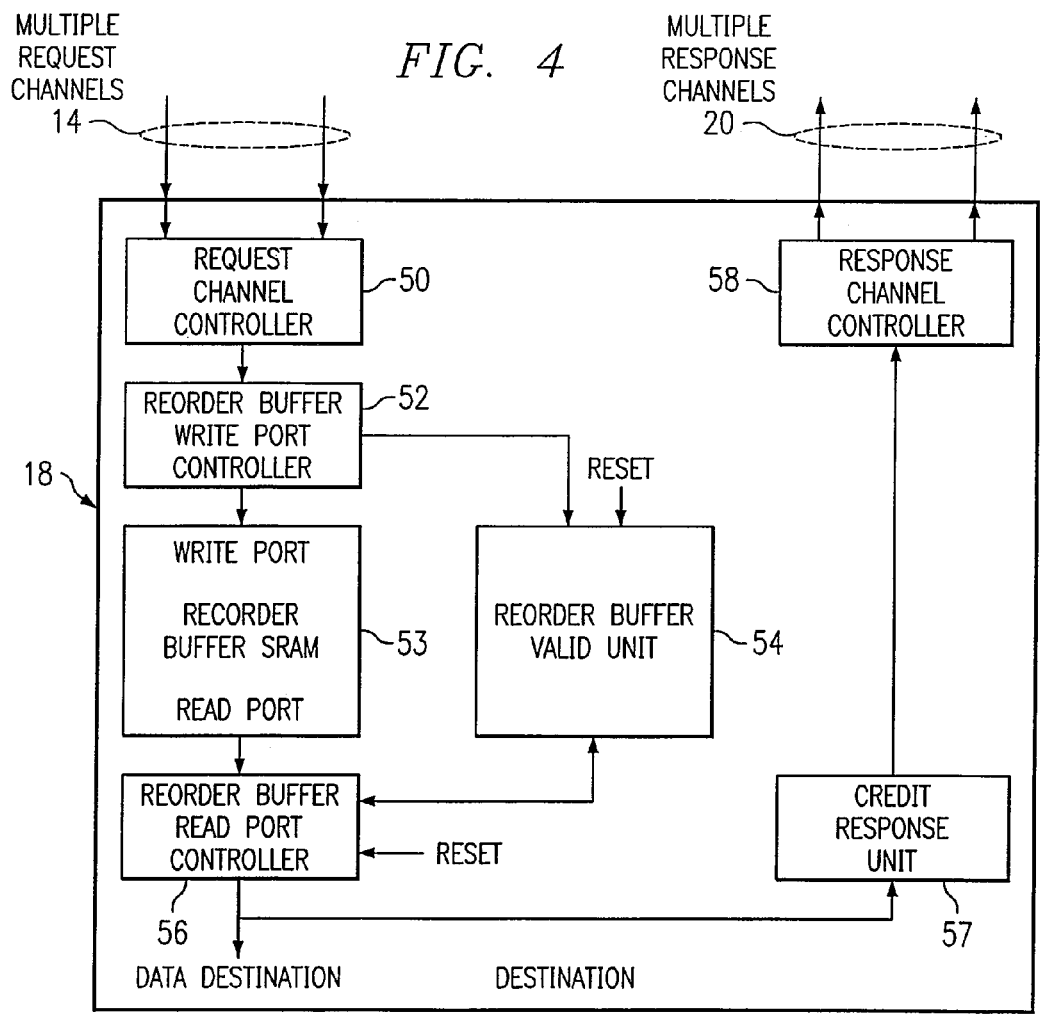
FIG. 4 illustrates a block diagram of a destination for processing data packets in the multiple channel data transfer system.

FIG. 4 shows the processing performed at destination 18. Destination 18 includes a destination request channel controller 50, a re-order buffer write port controller 52, a re-order buffer 53, a re-order buffer valid bit unit 54, a re-order buffer read port controller 56, a credit response unit 57, and a destination response channel controller 58. In operation, destination request channel controller 50 receives data packets from source 12 over multiple request channels 14. Destination request channel controller 50 provides the data packets to a re-order buffer write port controller 52. Ordering of data packets is not guaranteed over multiple request channels 14. To regain the proper ordering of the data packets, re-order buffer write port controller uses the sequence numbers in the data packets to directly index into re-order buffer 53 through its write port. Re-order buffer valid bit unit 54 maintains a valid bit for each portion of re-order buffer 53. When re-order buffer write port controller 52 causes data packets to be stored in re-order buffer 53, a corresponding valid bit is set. Re-order buffer read port controller 56 monitors the valid bits. When a next sequential valid bit is set, the data packets associated with the immediately preceding valid bit in the corresponding portion of re-order buffer 53 are read from its read port and provided to a data destination. Once the data packets have been read from re-order buffer 53, the corresponding valid bit is cleared. All valid bits may be cleared in response to a reset signal. Through use of the sequence numbers, data packets are read from re-order buffer 53 in their original order of generation. As packets are read from re-order buffer 53, credit response unit 57 returns flow control credits back to source 12 through destination response channel controller 58 over multiple response channels 20.

Thus, it is apparent that there has been provided, in accordance with the present invention, a system and method for ordering data transferred over multiple channels that satisfies the advantages set forth above. Although the present invention has been described in detail, it should be understood that various changes, substitutions, and alterations may be made herein. For example, the functionality for providing sequence numbers and flow control credits may be performed in any number of ways other than the implementation described above for appropriate sequence number and credit processing. Other examples may be readily ascertainable by those skilled in the art and may be made herein without departing from the spirit and scope of the present invention as defined by the following claims.

What is claimed is:

1. A method for ordering data transferred over multiple channels, comprising:

generating a first data packet in a particular packet flow in response to a first flow control credit;

generating a first sequence number;

inserting the first sequence number into the first data packet;

selecting a first one of a plurality of channels to transfer the first data packet according to channel capacities of the plurality of channels;

transferring the first data packet over the selected first one of the plurality of channels;

generating a second data packet in the particular packet flow in response to a second flow control credit;

generating a second sequence number;

inserting the second sequence number into the second data packet;

selecting a second one of a plurality of channels to transfer the second data packet according to channel capacities of the plurality of channels;

transferring the second data packet of the particular packet flow over the selected second one of the plurality of channels, the second one of the plurality of channels being different than the first one of the plurality of channels as a result of varying channel capacities among the plurality of channels.

2. The method of claim 1, further comprising:

incrementing the sequence number in response to transfer of the first data packet.

3. The method of claim 1, further comprising:

decrementing a number of flow control credits in response to transfer of the first data packet.

4. The method of claim 3, further comprising:

receiving a reply, the reply including a flow control credit;

incrementing a number of flow control credits in response to receipt of the reply.

5. The method of claim 1, further comprising:

resetting the sequence number to an initial value.

6. A system for ordering data transferred over multiple channels, comprising:

a sequence number unit operable to generate a first sequence number;

a request channel controller operable to receive a first data packet of a particular packet flow in response to a first flow control credit, the request channel controller operable to insert the first sequence number into the first data packet, the request channel controller operable to select a first one of a plurality of request channels according to channel capacities of the plurality of request channels, the request channel controller operable to transfer the first data packet over the selected first one of the plurality of request channels, the request channel controller operable to receive a second data packet in the particular packet flow in response to a second flow control credit, the request channel controller operable to insert a second sequence number into the second data packet, the request channel controller operable to select a second one of the plurality of request channels according to channel capacities of the plurality of request channels, the request channel controller operable to transfer the second data packet over the selected second one of the plurality of request channels, the second one of the plurality of channels being different than the first one of the plurality of channels as a result of varying channel capacities among the plurality of channels.

7. The system of claim 6, wherein the request channel controller is operable to generate an increment signal, the sequence number unit operable to advance the sequence number in response to the increment signal.

8. The system of claim 6, further comprising:

a credit counter unit operable to maintain a number of flow control credits.

9. The system of claim 8, wherein the request channel controller is operable to generate a decrement signal, the credit counter unit operable to reduce the number of flow control credits in response to the decrement signal.

10. The system of claim 8, wherein the credit counter unit is operable to increment the number of flow control credits in response to receipt of a reply including a flow control credit.

11. A system for ordering data transferred over multiple channels, comprising:

a write port controller operable to receive a plurality of data packets of a particular packet flow in a non-sequential order over different ones of a plurality of channels, each data packet including a sequence number;

a re-order buffer operable to store the plurality of data packets, the write port controller operable to place each data packet into the re-order buffer in response to its sequence number;

a valid bit unit operable to generate a valid bit for each portion of the re-order buffer, the valid bit unit operable to set a valid bit for a corresponding portion of the re-order buffer in response to a data packet being stored therein;

a read port controller operable to provide data packets in a sequential order in response to a valid bit being set.

12. The system of claim 11, wherein the read port controller is operable to generate a flow control credit in response to providing a data packet from the re-order buffer.

13. The system of claim 11, wherein the read port controller is operable to clear the valid bit upon providing a data packet from the re-order buffer.

14. The system of claim 11, wherein the write port controller uses the sequence numbers to directly index the re-order buffer.

* * * * *